UNITED STATES PATENT OFFICE.

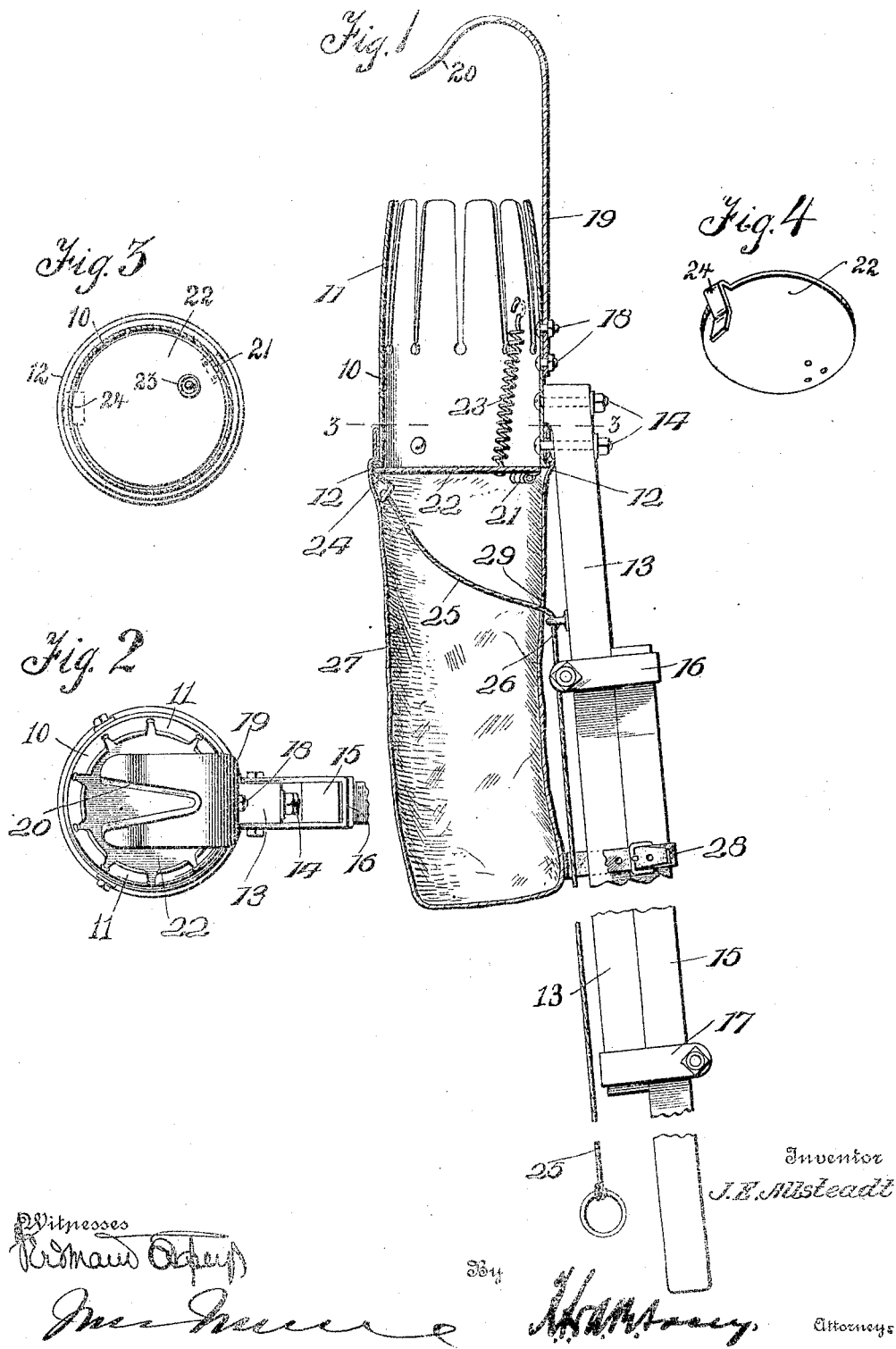

JOHN E. ALLSTEADT, OF HASTINGS, NEBRASKA.

FRUIT-PICKER.

1,089,521.   Specification of Letters Patent.   Patented Mar. 10, 1914.

Application filed May 7, 1913. Serial No. 766,149.

*To all whom it may concern:*

Be it known that I, JOHN E. ALLSTEADT, a citizen of the United States, residing at Hastings, in the county of Adams and State of Nebraska, have invented certain new and useful Improvements in Fruit-Pickers, of which the following is a specification.

This invention relates to improvements in fruit pickers for gathering fruit from the branches of trees and without injuring the fruit, and has for one of its objects to simplify and improve the construction and increase the efficiency and utility of devices of this character.

Another object of the invention is to provide a simply constructed device whereby the fruit may be severed and gathered in a receiver and thence conducted into a receptacle.

With these and other objects in view the invention consists in certain novel features of construction as hereinafter shown and described and then specifically pointed out in the claims, and in the drawings illustrative of the preferred embodiment of the invention.

Figure 1 is a side elevation partly in section of the improved device. Fig. 2 is a plan view of the same. Fig. 3 is a transverse section on the line 3—3 of Fig. 1, without the fabric conductor or the supporting member. Fig. 4 is a perspective view from beneath of the swinging door of the receiver.

Corresponding and like parts are referred to in the following description and indicated in all the views of the drawings by the same reference characters.

The improved device comprises a receiver represented as a whole at 10 and preferably of sheet metal and cylindrical in outline and open at both ends, the cylinder being formed at its upper end into a plurality of integral fingers or prongs 11 curved slightly inward and with an annular outwardly directed rib 12 encircling the lower end. An upper handle member 13 is bolted or otherwise secured at 14 to the receiver 10, and is preferably arranged at a slight angle to the longitudinal plane of the receiver. A lower handle member 15 is arranged for adjustment longitudinally of the upper handle member 13, the two handle members being coupled by clip devices 16—17, so that the handle members may be extended to any required extent.

Connected by bolts or like devices 18 to the receiver 10 at one side, preferably at the same side as the handle member 13, is an arm 19 extending above the receiver 10 and curving over the same, the upper terminal of the arm 19 being forked as represented at 20 with the inner terminal of the forked portion converging with the abutting edges sharpened or knife-edged to form a stem severing element. The forked portion 20 of the arm is located directly above the receiver 10 and spaced from the forked upper terminal of the same.

Hingedly connected at 21 within the receiver 10 is a door or bottom member 22 which forms a swinging closure to the bottom of the receiver. A spring 23 is connected to the swinging member 22 and unites the same to the receiver 10, and thus supports the member 22 yieldably in its closed position or at right angles to the longitudinal plane of the receiver. Attached to the swinging member 22 at its free edge is a catch 24 which projects beneath the rib 12 of the member 10 and thus forms a stop to limit the upward movement of the member 22. A pull cord 25 is connected to the catch 24 and extends through suitable guides 26 upon the handle members 13—15, and thence to a point convenient to the hand of the operator. It will thus be obvious that by pulling upon the cord 25 the closure 22 may be opened against the resistance of the spring 23, and then when the cord is released the closure will be returned with the catch 24 against the lower rim of the receiver 10. A receptacle 27 is connected over the rim 12 of the receiver 10 and hangs suspended below the receiver as shown. The receptacle 27 is preferably of canvas or like fabric, and is provided with a band 28 to enable it to be fastened at its lower end to the handle members 13—15, and thus prevent the receptacle from being thrown about when the device is moved from place to place. The receptacle 27 is provided with an aperture 29 through which the pull cord 25 passes.

In operating the device the handle members 13—15 are adjusted longitudinally to adapt the device to the size of the tree from which the fruit is to be gathered, the handles being extended preferably to a distance sufficient to enable the forked portion 20 of the arm 19 to reach the highest article of fruit upon the tree to adapt the device to all of the fruit which is to be picked. The forked portion 20 is then engaged with the stem above the fruit which brings the fruit above the receptacle 10. The implement is then drawn downwardly and pushed toward the fruit which causes the knife-edged portion of the fork 20 to sever the stem and drop the fruit into the receiver. A pull upon the cord 25 will then depress the member 22 and cause the fruit to roll into the receptacle 27. The releasing of the pull cord 25 will permit the spring 23 to return the member 22 to its upper position for the next operation. By this means as much fruit may be gathered as will fill the receptacle 27. When this is accomplished the implement is lowered to a horizontal position and the pull cord actuated to open the closure 22 and permit the fruit within the receptacle 27 to roll out into a receptacle or other suitable receiver.

The improved device is simple in construction, may be constructed of any suitable size and any suitable capacity and of any suitable material.

The member 10 is preferably of sheet metal while the handle sections 13—15 are preferably of wood, but other material may be employed if preferred.

The receptacle 27 may be bolted or otherwise secured to the member 23, and if preferred, one of the bolts 14 by which the handle 13 is secured in position may be utilized for holding the member 27 in position for engagement with the member 10.

Having thus described the invention, what is claimed as new is:

1. A fruit picker comprising a receptacle of rigid material open at the ends and with an outwardly directed flange at the lower end, a receiver of fabric material bearing at its upper end around said flange and supported thereby, a closure swingingly connected to said receptacle, and operative within the fabric receiver, a stop device extending from said closure at the side opposite from the hinge, a spring engaging said closure and yieldably maintaining the same in closed position with the stop device engaging the flange, and means for depressing said closure against the resistance of said spring.

2. A fruit picker comprising a receiver of rigid material, a swinging closure for the lower end of said receiver, a spring operating to yieldably maintain said closure in elevated position, a fabric receptacle depending from said receiver and closed at the lower end and into which said closure moves when depressed, an upper pole section connected to said receiver, a lower pole section slidable relative to the upper pole sections, means for adjustably coupling said pole sections, and means for depressing said closure.

3. A fruit picker comprising a receiver of rigid material, an arm connected to said receiver and curving over the same and with a converging recess in the curved portion, a swinging closure for the lower end of said receiver, a spring operating to yieldably maintain said closure in elevated position, a fabric receptacle depending from said receiver and closed at the lower end and into which said closure moves when depressed, means for depressing said closure, a supporting device for said receiver, and means for actuating said closure against the resistance of said spring.

In testimony whereof I affix my signature in presence of two witnesses.

JOHN E. ALLSTEADT. [L. S.]

Witnesses:
J. H. UERLING,
W. M. BOLES.